C. F. SPEIDEL.
LENS TUBE ADJUSTMENT FOR CAMERAS.
APPLICATION FILED DEC. 19, 1921.
1,435,562.  Patented Nov. 14, 1922.
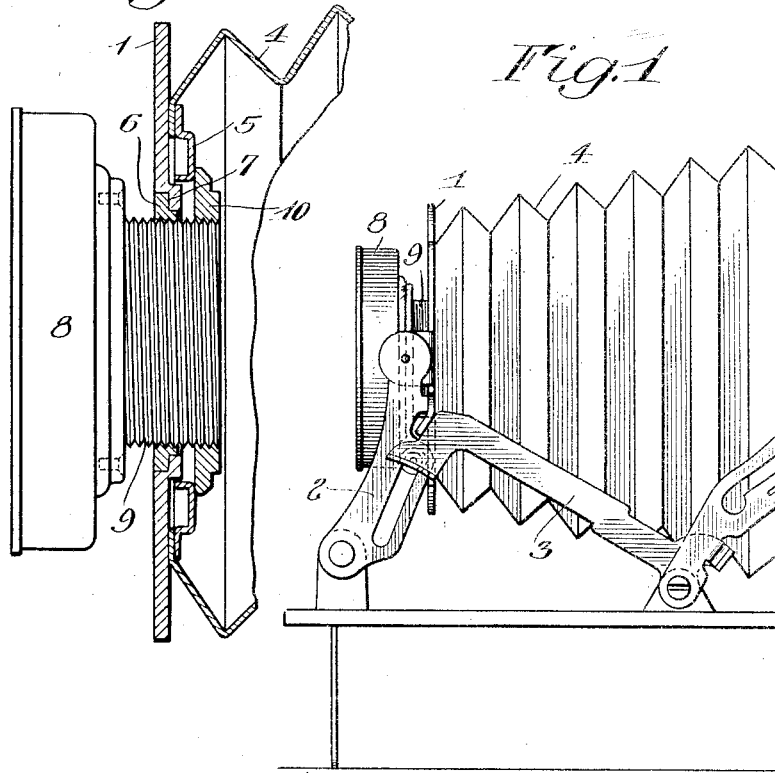
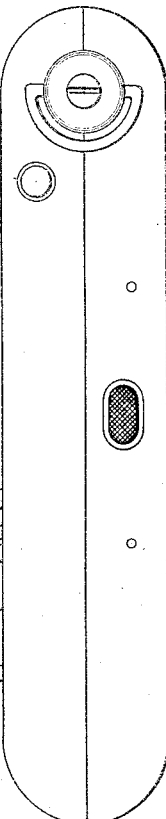
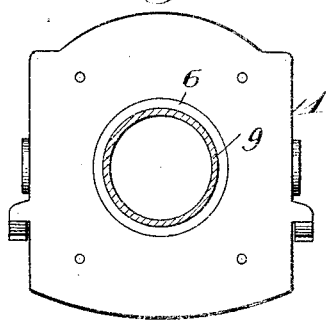
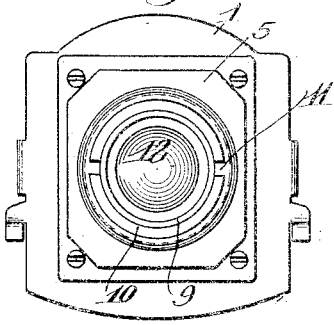
INVENTOR.
Charles F. Speidel
BY Fredrich F. Church
his ATTORNEY Patented Nov. 14, 1922.

1,435,562

UNITED STATES PATENT OFFICE.

CHARLES F. SPEIDEL, OF ROCHESTER, NEW YORK, ASSIGNOR TO EASTMAN KODAK COMPANY, OF ROCHESTER, NEW YORK, A CORPORATION OF NEW YORK.

LENS-TUBE ADJUSTMENT FOR CAMERAS.

Application filed December 19, 1921. Serial No. 523,314.

*To all whom it may concern:*

Be it known that I, CHARLES F. SPEIDEL, of Rochester, in the county of Monroe and State of New York, have invented certain new and useful Improvements in Lens-Tube Adjustments for Cameras; and I do hereby declare the following to be a full, clear, and exact description of the same, reference being had to the accompanying drawing, forming a part of this specification, and to the reference numerals marked thereon.

My present invention relates to photography, and more particularly, to photographic cameras, and it has for its object to provide a simple, cheap and convenient method of adjusting the lens tube in the lens board or front to initially focus the lens in setting up the camera. To these and other ends the invention consists in certain improvements and combinations of parts, all as will be hereinafter more fully described, the novel features being pointed out in the claims at the end of the specification.

In the drawings:

Figure 1 is a side elevation of a folding camera constructed in accordance with and illustrating one embodiment of my invention;

Figure 2 is an enlarged fragmentary vertical central section through the lens board and bellows;

Figure 3 is a front view of the lens board showing the lens tube in section, and Figure 4 is a rear view of the front or lens board with the bellows removed.

Similar reference numerals throughout the several views indicate the same parts.

My invention is particularly applicable where the lens tube and shutter casing are built together with the lens either in the tube or in the casing for the reason that with my invention it is not necessary to rotate the threaded tube to focus the lens and therefore the shutter casing is not left in a sideways or other than upright position when the lens has reached its focus as is otherwise apt to be the case with the lens tube and shutter both together. I have illustrated the invention in connection with such a structure and have shown a folding pocket camera of a familiar type, the general features of which are of no consequence herein and will not be described. It is sufficient to say that 1 indicates the lens board constituting part of a front embodying supporting links 2 and an erecting brace 3. The bellows 4 at its front end is connected to the lens board 1 by a raised metal frame 5 beneath which it is clamped as shown in Figures 2 and 4.

In the center of the lens board I provide a rabbeted annular nut 6 that preferably lies flush therewith and occupies a rabbeted circular opening in the board in which it is free to rotate while providing a light tight joint, the opening being formed in a manner complementary to the rabbet of the nut as shown. The shutter casing containing the shutter mechanism is indicated at 8 and has built on to it a rearwardly extending threaded lens tube 9 by means of which it is supported. This tube is threaded through the nut 6 which also forms a light tight joint and its projecting end in rear of the lens board has threaded thereon an annular lock nut 10 preferably provided with sockets 11 for a spanner wrench. When screwed tight this lock nut 10 bears against the bellows securing frame 5.

In using my invention to focus a lens 12 (Figure 4) contained in either the tube 9 or shutter casing 8 to agree with the extent of projection of the lens board 1, the lock nut 10 is loosened and the lens tube retracted or projected until the focus is reached by rotating the nut 6, or the nut 6 may be held to the lens board and the lens tube screwed in or out, in which latter case relative movement of the nut and lens board is utilized to a limited extent merely to right the shutter. The lock nut 10 is then screwed down tight and the parts are locked in this position of adjustment.

My invention is particularly useful in setting up cheap cameras because the construction gives a fine adjustment and yet is inexpensive and easy to assemble.

I claim as my invention:

1. In a photographic camera, the combination with a lens board having an opening therein, of a nut fitting within the opening, a shutter casing having a threaded collar extending through the nut, means for locking the collar to the lens board and a lens carried by the shutter casing.

2. In a photographic camera, the combination with a lens board having a circular opening therein, of a nut fitting within the opening and rotatable therein, a shutter casing having a threaded collar extending through the nut, a lock nut on the collar cooperating with the board and a lens carried by the shutter casing.

3. In a photographic camera, the combination with a lens board having a rabbeted opening therein, of a nut rabbeted in a complementary manner fitting within the opening to make a light tight joint, a shutter casing having a threaded collar extending through the nut, means for locking the collar to the lens board and a lens carried by the shutter casing.

4. In a photographic camera, the combination with a lens board having a circular rabbeted opening therein, of a nut rabbeted in a complementary manner fitting within the opening to make a light tight joint and rotatable therein, a shutter casing having a threaded collar extending through the nut, a lock nut on the collar cooperating with the board and a lens carried by the shutter casing.

CHARLES F. SPEIDEL.